Oct. 30, 1951 F. H. FLETCHER, JR 2,573,425
SEAL FOR CENTRIFUGAL MACHINES
Filed June 23, 1947 2 SHEETS—SHEET 1
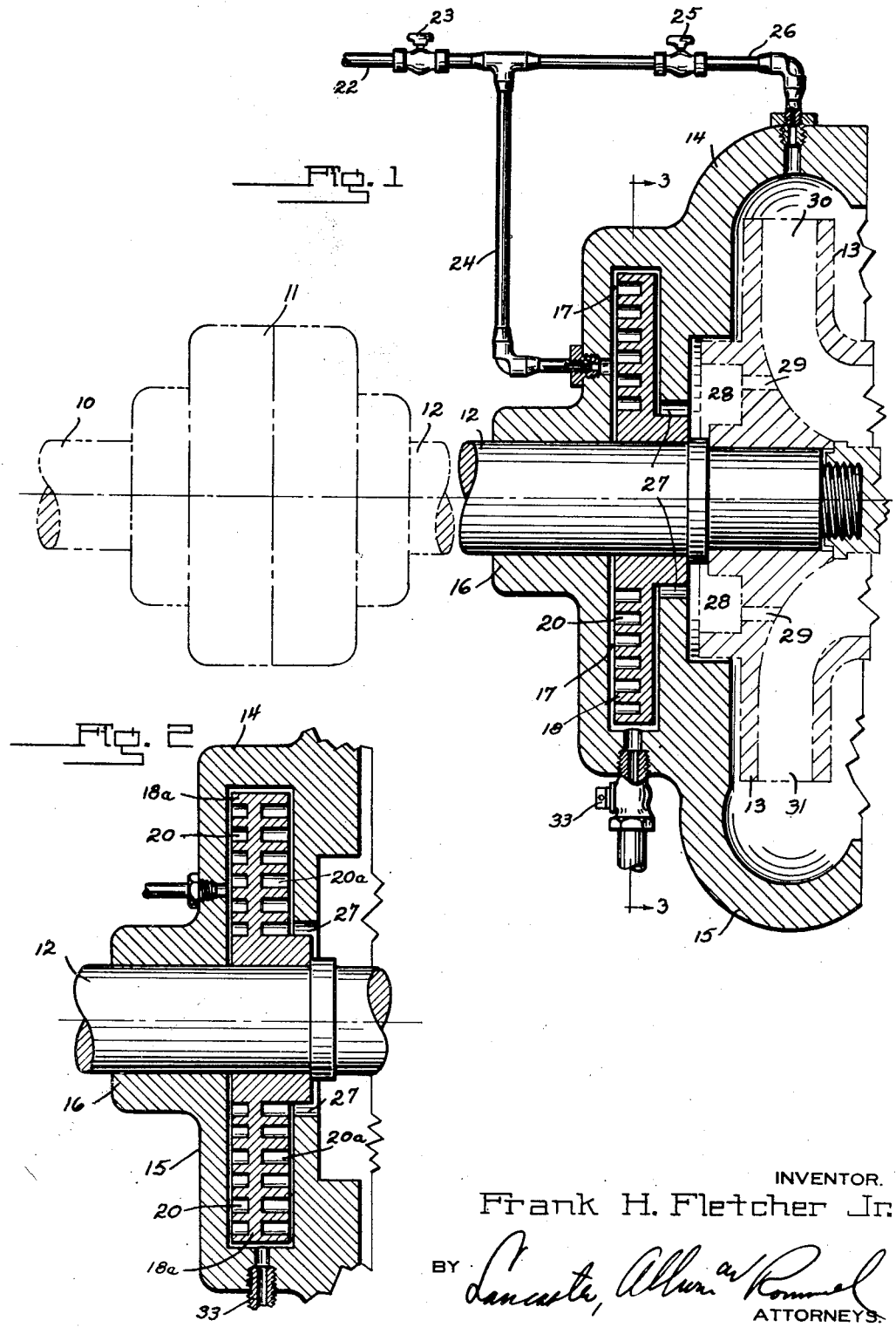
INVENTOR.
Frank H. Fletcher Jr.
BY Lancaster, Allwine & Rommel
ATTORNEYS Oct. 30, 1951  F. H. FLETCHER, JR  2,573,425
SEAL FOR CENTRIFUGAL MACHINES
Filed June 23, 1947  2 SHEETS—SHEET 2
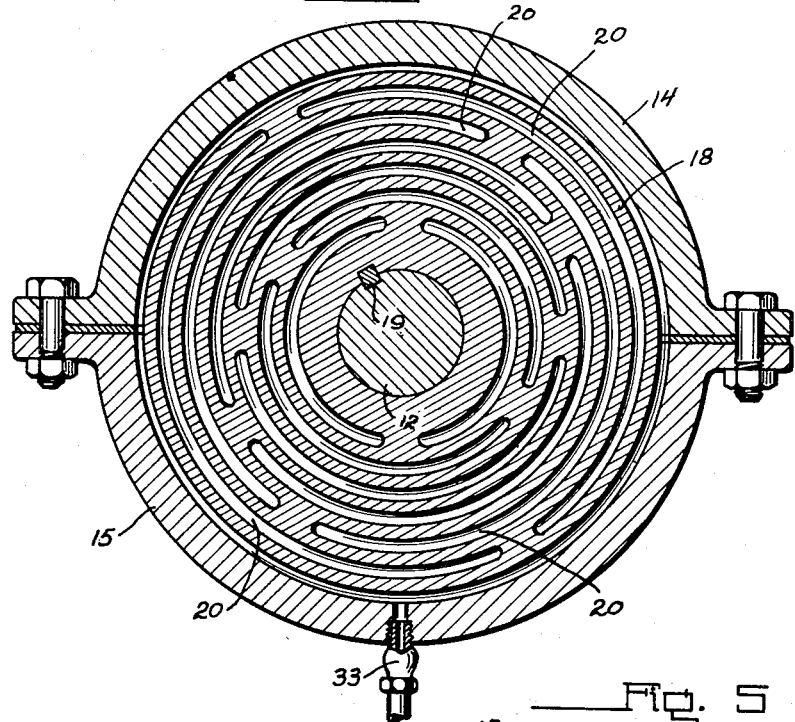
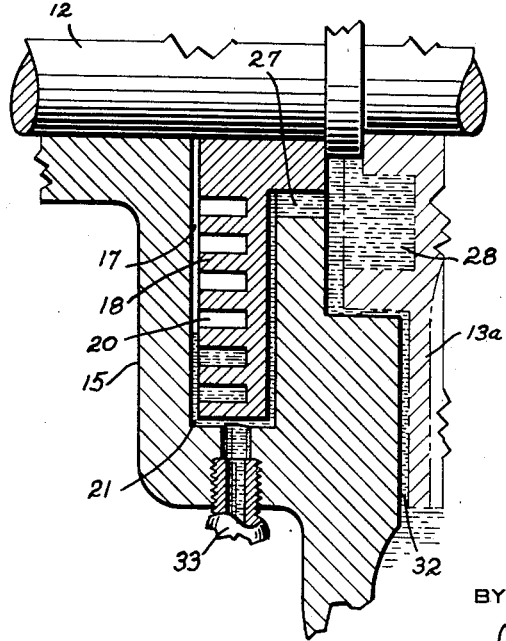
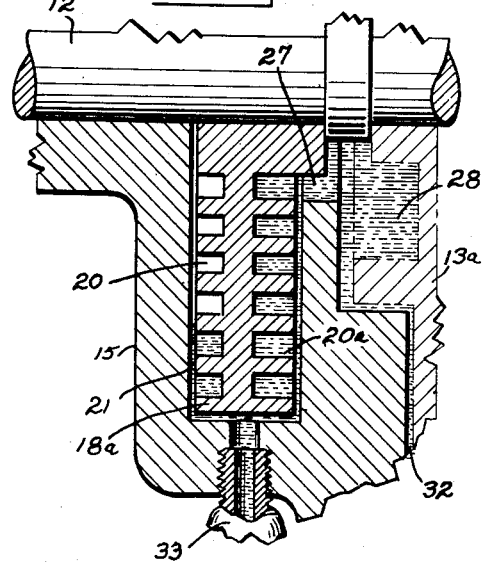
INVENTOR.
Frank H. Fletcher Jr.
BY
ATTORNEYS.

Patented Oct. 30, 1951

2,573,425

UNITED STATES PATENT OFFICE 2,573,425

SEAL FOR CENTRIFUGAL MACHINES

Frank H. Fletcher, Jr., Flushing, N. Y., assignor to Ethel K. Haferkamp and Mary Elliott Haferkamp, both of Oswego, N. Y., and Virginia H. Fletcher, Flushing, N. Y.

Application June 23, 1947, Serial No. 756,429

3 Claims. (Cl. 286—9)

This invention relates to sealing devices, and more particularly to a sealing device applicable to centrifugal machines, centrifugal pumps, turbines and the like, of which the opposite sides of a casing wall through which the rotatable shaft extends are exposed to different pressures of gas or liquid.

The invention more specifically relates to a liquid centrifugal seal in which the liquid is rendered effective by centrifugal force to serve as a packing medium for the rotatable shaft.

In seals of the type referred to, as heretofore constructed, complicated mechanical sealing devices were employed to render the chamber of a pump air-tight during the priming operation. Also, in seals heretofore employed to seal pumps operating with a pressure on the inlet side of the pump, an undesirable leakage of the sealing liquid often occurred.

The present invention, generally stated, comprises a device wherein the sealing is accomplished by a rotating sealing disc packing or forcing the sealing liquid with a centrifugal force outwardly against the inner walls of a sealing chamber. The sealing liquid being water or any other suitable liquid including, when desirable in a pump, the liquid being pumped.

The seal has but one mechanical moving part, exclusive of the liquid, this being the sealing disc. This disc may be arranged to prevent a flow of pressure from the rotor chamber, or to prevent a flow of pressure into the rotor chamber. The basic fundamentals of construction and operation remain the same in either case.

Such a seal as herein described is shown in my application, Serial No. 756,431, concurrently filed herewith, for a Centrifuge.

The principal object of this invention is to provide an efficient and effective seal between pressure or vacuum chambers, containing rotatable elements, and the exterior.

An object is to provide a seal device that will maintain at all times an effective seal against either a vacuum or a pressure.

A further object is to provide a liquid seal of such construction and arrangement as to be non-leaking either before or during operation.

A further object is to provide a seal disc of improved design or construction wherewith a plurality of centrifugal pressures develop in the sealing liquid and become additive with respect to the total sealing force.

Still further objects and advantages will be apparent from the following description, the claims, and the accompanying drawings in which:

Figure 1 is a sectional side elevation of a portion of a pump housing showing the liquid centrifugal seal and liquid supply line, Figure 2 is a sectional side elevation of a portion similar to Figure 1 but showing a modification of the seal disc, Figure 3 is a sectional end view taken along and viewed in the direction indicated by line 3—3 of Figure 1, Figure 4 is a section of the lower portion of the seal of Figure 1 showing the indicated liquid level of the seal, and Figure 5 is a view similar to that of Figure 4 showing the liquid level of the seal with the modified seal disc.

As shown in Figure 1 a drive shaft 10, driven by means of any suitable prime mover, is connected by means of coupling 11 to rotor shaft 12 of a pump impeller 13 whose enclosing casing comprising upper half 14 and lower half 15 also forms a bearing 16 in which shaft 12 may be journaled.

Suitably formed in the upper and lower halves of the casing members 14 and 15 is a circular chamber 17 in which the seal disc 18 rotates with minimum clearance. The seal disc 18 tightly fits shaft 12 to which it is further secured by means of key 19 (Figure 3).

The seal disc 18 is provided on one of its faces with discontinuous concentric grooves 20, shown in Figure 3, with overlapping ends forming a plurality of staggered concentric grooves so arranged that in any direction radially from the shaft 12 a plurality of these grooves 20 will be encountered. The purpose of these grooves is to contain sealing fluid which rotates with and exerts a centrifugal force on the outermost surface of the groove which pressure is in turn applied against the wall of the chamber that it faces when rotating. Rotating at high velocities the grooved sealing disc 18 causes a centrifugal force to be exerted against the sealing chamber walls equivalent to at least that of the total of the individual centrifugal forces created in the disc grooves 20.

The space between the walls of the seal disc chamber 17 and the seal disc 18 as well as the grooves 20 is filled with any suitable liquid 21 such as water or oil (Figure 4) which, through centrifugal force as it rotates with the seal disc 18, is forced against the walls of the seal disc chamber with such pressure as to prevent the flow of fluid along the shaft between the pump impeller chamber and the exterior via the bearing.

As shown in Figure 1 the smooth face of the seal disc 18 is positioned toward the pressurized pump impeller chamber, while the grooved face of the seal disc is positioned so that the centrifugal force is most effectively placed to resist the flow tendency of the liquid within the pump impeller chamber toward the lower pressure side of the seal.

A system for replacement of the seal liquid vaporized by the high temperature due to friction between it and the seal disc at high velocities, and for filling the seal disc chamber 17 with liquid and keeping it filled to maintain a seal even while the pump impeller 13 is inoperative, and also to maintain a supply of liquid from the pump chamber when the impeller is operating, as well as to prime the pump, is shown in Figure 1 where pipe 22 attached to a suitable source furnishes liquid by means of control valve 23 and pipe 24 to the seal chamber 17. By means of control valve 25 liquid may be admitted to the pump impeller chamber through pipe 26 for priming purposes. When the pump impeller 13 is in operation liquid supply valve 23 may be closed and valve 25 opened to permit liquid from the high pressure portion of the pump impeller chamber to flow out through pipe 26, valve 25 and pipe 24 into the seal disc chamber.

In the case of a centrifugal pump a return system has been provided for the overflow of liquid from the seal disc chamber through a port 27 (Figures 1 and 4) into a circular chamber 28 formed by the end of the impeller hub and through ports 29 to the impeller discharge channels 30 and 31. In this system a constant circulation of the liquid being pumped may be supplied to the liquid seal. In the event that oil or other liquids are being pumped pipe 22 may be connected to a suitable source of such liquids. In the event liquid from the pump impeller chamber is desired to keep the seal chamber full, the supply system including pipe 26 and valve 25 may be omitted or valve 25 kept closed and the liquid from the impeller chamber supplied to the seal chamber from around the impeller 13a as shown at 32 in Figure 4.

For use in a vacuum or suction pump there is shown in Figures 2 and 5 a modification 18a of the seal disc 18 wherein concentric grooves 20 and 20a are provided on both faces of the seal disc. The deeper grooves 20a face the pump chamber so that the centrifugal forces developed by them will withstand the lower than atmospheric pressure from within the pump chamber. The grooves 20a are concentrically disposed and staggered in similar manner to the grooves 20 shown in Figure 3. The smaller grooves 20 provide sufficient centrifugal force to assure the positive outward flow or force of the liquid introduced into the sealing chamber to maintain adequate coverage of the outer periphery of the sealing disc. The effect of these smaller grooves 20 also prevents leakage of the sealing liquid out through the seal shaft opening or bearing.

In Figures 4 and 5 are indicated the correct positions and levels of the sealing liquid 21 when the seal disc is operating. Figure 4 shows the seal on a pressure pump, while Figure 5 indicates the sealing disc with grooves on both faces for use with a vacuum pump.

A drain cock 33 has been provided in the bottom of the seal disc chamber for the purpose of draining this chamber when desirable and for the removal of any foreign matter that may contaminate the sealing liquid.

It will be readily understood that the centrifugal force that renders the sealing agent effective within the seal chamber is not developed by the sealing liquid being propelled by blades or vanes but rather it is produced by (or is equivalent to) the total of the individual centrifugal forces developed within the grooves on the face of the disc. In operation the rotating sealing disc causes the liquid within each groove to develop a centrifugal force directly proportional to the groove's distance (radius) from the center of the disc or shaft. The total centrifugal force exerted on the side of the sealing disc is the sum of these individual forces. Therefore the greater the number of grooves on the side of the sealing disc, the greater will be the number of individual centrifugal forces developed on a side of the sealing disc, and the total force developed in the liquid between the side of the disc and the inner wall of the seal chamber will be the sum of these individual forces.

While two embodiments of this invention have been shown for purposes of illustration, it is to be understood that various changes in details of construction and arrangement of parts may be made without departing from the scope of the invention as set forth in the appended claims.

What is claimed is:

1. A liquid seal disc provided with a plurality of concentric grooves in both of its faces, all of said grooves being concentrically arranged, of less length than 360°, spaced from the periphery of said disc and adapted to contain a liquid and impart centrifugal force thereto when said disc is rotated, the grooves on one face of said disc being deeper than those on the opposite face.

2. A liquid seal disc provided with a plurality of concentric grooves in both of its faces, all of said grooves being of substantially the same width and less than 360° length, with the grooves in one face being deeper than the grooves in the opposite face, said grooves being adapted to contain a liquid and the faces thereof to impart centrifugal force to said liquid when said disc is rotated.

3. A liquid seal disc provided with a plurality of concentric grooves in both of its faces, all of said grooves being of substantially the same width and less than 360° length, with the grooves in one face being deeper than the grooves in the opposite face, and each groove having one longitudinal face thereof facing and paralleling the opposite longitudinal face thereof throughout their lengths and breadths, said grooves being adapted to contain a liquid and the faces thereof to impart centrifugal force to said liquid when said disc is rotated.

FRANK H. FLETCHER, Jr.

REFERENCES CITED

The following references are of record in the file of this patent:

UNITED STATES PATENTS

| Number | Name | Date |
|---|---|---|
| 876,613 | Wilkinson | Jan. 14, 1908 |
| 1,732,761 | Marsland | Oct. 22, 1929 |
| 1,999,163 | Allen | Apr. 23, 1935 |
| 2,127,865 | Goddard | Aug. 23, 1938 |
| 2,331,641 | Walker | Oct. 12, 1943 |